US010557358B2

(12) United States Patent
Creed et al.

(10) Patent No.: US 10,557,358 B2
(45) Date of Patent: Feb. 11, 2020

(54) GAS TURBINE ENGINE CONTAINMENT STRUCTURES

(71) Applicant: UNITED TECHNOLOGIES CORPORATION, Farmington, CT (US)

(72) Inventors: Phillip Creed, Tollhouse, CA (US); Jesus A. Garcia, San Diego, CA (US); Nagendra N. Kedlaya, San Diego, CA (US); Sean G. Breadmore, San Diego, CA (US); Emmanuel Medel, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 539 days.

(21) Appl. No.: 14/616,235

(22) Filed: Feb. 6, 2015

(65) Prior Publication Data

US 2016/0230578 A1    Aug. 11, 2016

(51) Int. Cl.
*F01D 9/04* (2006.01)
*F01D 25/24* (2006.01)
*F01D 21/04* (2006.01)
*F01D 25/00* (2006.01)
(Continued)

(52) U.S. Cl.
CPC .............. *F01D 9/042* (2013.01); *F01D 5/02* (2013.01); *F01D 21/045* (2013.01); *F01D 25/005* (2013.01); *F01D 25/24* (2013.01); *F04D 29/321* (2013.01); *F05D 2220/32* (2013.01); *F05D 2240/12* (2013.01); *F05D 2300/171* (2013.01); *F05D 2300/175* (2013.01); *F05D 2300/177* (2013.01)

(58) Field of Classification Search
None
See application file for complete search history.

(56) References Cited

U.S. PATENT DOCUMENTS 3,088,279 A * 5/1963 Diedrich ................... F23R 3/42
60/39.826
3,116,908 A * 1/1964 Wosika ..................... F01D 1/08
415/143

(Continued)

FOREIGN PATENT DOCUMENTS

| EP | 0333129 A2 | 9/1989 |
| EP | 1801254 A1 | 6/2007 |
| EP | 2058415 A1 | 5/2009 |

OTHER PUBLICATIONS

"Nitronic 60." High Performance Alloys, Inc., Jan. 2009. Web. Apr. 30, 2017. <http://www.hpalloy.com/docs/NITRONIC60-bullet.pdf>.*

(Continued)

*Primary Examiner* — William M McCalister
*Assistant Examiner* — Richard K. Durden
(74) *Attorney, Agent, or Firm* — Cantor Colburn LLP

(57) ABSTRACT

A containment structure for a gas turbine engine includes a stator shroud with a wall. The stator shroud wall extends axially between a shroud inlet aperture and the shroud outlet aperture. The wall includes a stainless steel alloy material having less than 44% nickel by mass to provide containment protection for an impeller rotateably disposed within an interior of the stator shroud.

13 Claims, 4 Drawing Sheets

(51) Int. Cl.
*F01D 5/02* (2006.01)
*F04D 29/32* (2006.01)

(56) References Cited

U.S. PATENT DOCUMENTS

| | | | | |
|---|---|---|---|---|
| 3,305,165 | A | * | 2/1967 | Gregory .................. F04D 17/02 415/120 |
| 3,321,912 | A | * | 5/1967 | Ulrich .................... F02C 3/085 415/208.3 |
| 3,832,089 | A | * | 8/1974 | Moellmann ........... F04D 29/441 29/889.4 |
| 3,904,312 | A | * | 9/1975 | Exley ..................... F04D 29/44 415/181 |
| 3,912,503 | A | * | 10/1975 | Schumacher ......... C22C 38/001 420/42 |
| 4,854,126 | A | * | 8/1989 | Chevis ................... F01D 9/045 415/208.3 |
| 5,360,318 | A | | 11/1994 | Siga et al. |
| 6,279,322 | B1 | * | 8/2001 | Moussa ................. F04D 29/444 60/751 |
| 6,845,621 | B2 | * | 1/2005 | Teets ...................... F02C 3/085 60/732 |
| 7,025,566 | B2 | * | 4/2006 | Sasu ...................... F01D 9/045 415/208.3 |
| 7,442,006 | B2 | * | 10/2008 | Nguyen .............. F04D 29/4206 29/889.22 |
| 8,596,967 | B2 | * | 12/2013 | Rosen ................... F01D 21/045 415/173.1 |
| 9,003,805 | B2 | * | 4/2015 | Hernandez ............. F01D 9/045 60/751 |
| 2004/0191109 | A1 | * | 9/2004 | Maziasz ................ C22C 38/001 420/45 |
| 2006/0233636 | A1 | * | 10/2006 | Svensson ............. F01D 21/045 415/9 |
| 2009/0129967 | A1 | * | 5/2009 | Goller .................... C21D 6/004 420/38 |
| 2010/0031663 | A1 | * | 2/2010 | Commaret ................ F01D 9/02 60/751 |
| 2011/0296841 | A1 | * | 12/2011 | Napier ..................... F01D 9/02 60/751 |
| 2011/0308229 | A1 | * | 12/2011 | Hagshenas .............. F01D 5/048 60/39.091 |

OTHER PUBLICATIONS

European Search Report for Application No. EP16154455.

* cited by examiner

GAS TURBINE ENGINE CONTAINMENT STRUCTURES

BACKGROUND OF THE INVENTION

1. Field of the Invention

The present disclosure relates to gas turbine engines, and more particularly to containment structures for gas turbine engine rotary components.

2. Description of Related Art

Gas turbine engines typically include a core flow path that extends through a compressor section, a combustor section, and a turbine section. Air enters the core flow path through an inlet and undergoes compression in the compressor section. The compressor section communicates the compressed air to the combustor section, which introduces fuel into the compressed air and ignites the mixture to generate high-pressure combustion products. The combustor section communicates the high-pressure combustion products to the turbine section. The turbine section expands the high pressure combustion products, extracts work therefrom, and discharges the expanded combustion products to the environment external to the gas turbine engine.

Some gas turbine engines include housings that enclose the core flow path and provide containment protection for rotary components of the gas turbine engine. Such housings can be exposed to relatively high temperatures, and are therefore typically constructed of materials with chemical, physical, mechanical properties suitable for high temperature environments. Examples of materials for such housings include nickel-based alloys.

Such housings are satisfactory for their intended purpose. However, there is an ongoing need in the art for improved containment structures for gas turbine engines. The present disclosure provides a solution for this need.

SUMMARY OF THE INVENTION

A containment structure for a gas turbine engine includes a stator shroud with a wall. The stator shroud wall extends axially between a stator shroud inlet aperture and a stator shroud outlet aperture. The stator shroud wall bounds an interior of the stator shroud and defines therein an impeller cavity and a diffuser plate cavity. The stator shroud wall includes a stainless steel alloy material having less than 44% nickel by mass to provide containment protection for an impeller rotateably disposed within the impeller cavity.

In certain embodiments the stator shroud can include a stainless steel material with a nickel content of between about 8% and 9% by mass. Stator shrouds constructed from such stainless steel materials can have containment parameters that are substantially the same or better than shrouds constructed from nickel based alloys.

In accordance with certain embodiments, a rotation axis can extend between the inlet aperture and the outlet aperture of the stator shroud. The stator shroud can have a necked profile, the stator shroud inlet aperture being smaller than the stator shroud outlet aperture and the stator shroud radially widening therebetween. A wall of the stator shroud can define on or more diffuser vane seats on an interior wall surface that faces downstream and towards the shroud outlet aperture. The wall can have a thickness that decreases between the stator shroud outlet aperture and the diffuser vane seats, the wall thickness tapering in the axial direction between the outlet aperture and diffuser vane seats for example.

It is contemplated that the stator shroud can define a flow-straightening vane seat on the stator shroud interior surface between the diffuser vane seat and the stator shroud outlet aperture. The flow-straightening vane seat can face radially inward, towards the rotation axis. The wall thickness can thicken between the inlet aperture and a location of maximum wall thickness adjacent the impeller cavity of the stator shroud. The location of maximum thickness can be at an axial position where the stator shroud experiences temperatures greater than the crossover temperature of the material forming the wall.

A compressor module includes containment structure as described above, a diffuser plate, and an impeller. The diffuser plate seats within the shroud outlet aperture and couples to the interior surface of the stator shroud, for example, at the diffuser vane seats and the flow-straightening vane seats. The impeller is rotateably supported within the stator shroud at an axial position disposed between the diffuser plate and stator shroud inlet aperture, the stator shroud thereby providing containment protection for the impeller.

A gas turbine engine includes a containment structure as described above, a diffuser plate, an impeller, and a turbine. The diffuser plate seat within the shroud outlet aperture and couples to the stator shroud. The impeller is rotateably supported within the stator shroud between the diffuser plate and the shroud inlet aperture, and is coupled for common rotation with the turbine within the stator shroud and diffusor plate that both the stator shroud and diffusor plate provide containment protection for the impeller and turbine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
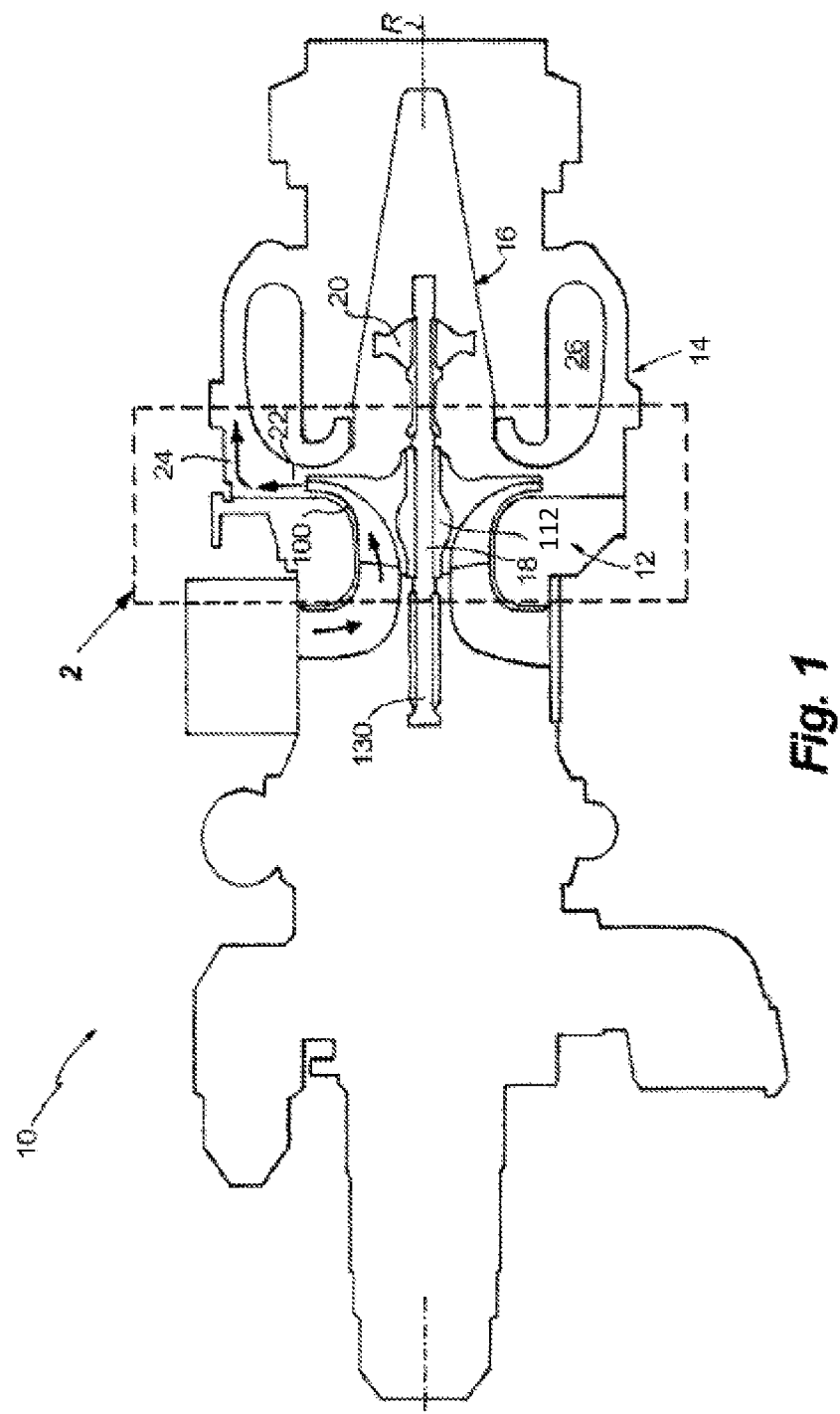
FIG. 1 is a cross-sectional side elevation view of an exemplary embodiment of a gas turbine engine constructed in accordance with the present disclosure, showing a compressor module with a containment structure.

Reference will now be made to the drawings wherein like reference numerals identify similar structural features or aspects of the subject disclosure. For purposes of explanation and illustration, and not limitation, an exemplary embodiment of a gas turbine engine having a containment structure in accordance with the disclosure is shown in FIG. 1 and is designated generally by reference character 10. Other embodiments of gas turbine engines in accordance with the disclosure, or aspects thereof, are provided in FIGS. 2-4, as will be described. The systems and methods described herein can be used for aircraft main engines and auxiliary power units.

Gas turbine engine 10 includes a compressor section 12 with a containment structure 100, a combustor section 14, and a turbine section 16 arranged along a rotation axis R. Compressor section 12 includes a centrifugal compressor 18 arranged along rotation axis R. Compressor 18 is in fluid communication with a turbine 20 through a core flow path extending therebetween, turbine 20 being disposed within turbine section 16 and arranged along rotation axis R. Compressor 18 is configured to ingest air axially on an upstream end of compressor section 12, compress the ingested air (illustrated with dashed arrows in FIG. 1), and discharge compressed air radially relative to rotation axis R. The compressed air traverses a diffusor 22 and flow-straightening vanes 24 as the compressed air flows downstream from compressor section 12.

Combustor chamber 26 arranged within combustor section 14 receive the compressed air from the core flow path, introduce fuel into the compressed air, and ignite the mixture to produce high-pressure combustion products. Combustion section 14 communicates the high-pressure combustion products to turbine section 16, which receives and expands the high-pressure combustion products across turbine 20. As turbine 20 expands the high-pressure combustion products, turbine 20 extracts work from the combustion products before discharging the expanded combustion products to the environment external to gas turbine engine 10. Turbine 20 applies the extracted work to drive compressor 18 and other component(s) operably associated with gas turbine engine 10, generally through a shaft and/or drive train elements coupling the component(s) to turbine 20.

Figure 2:
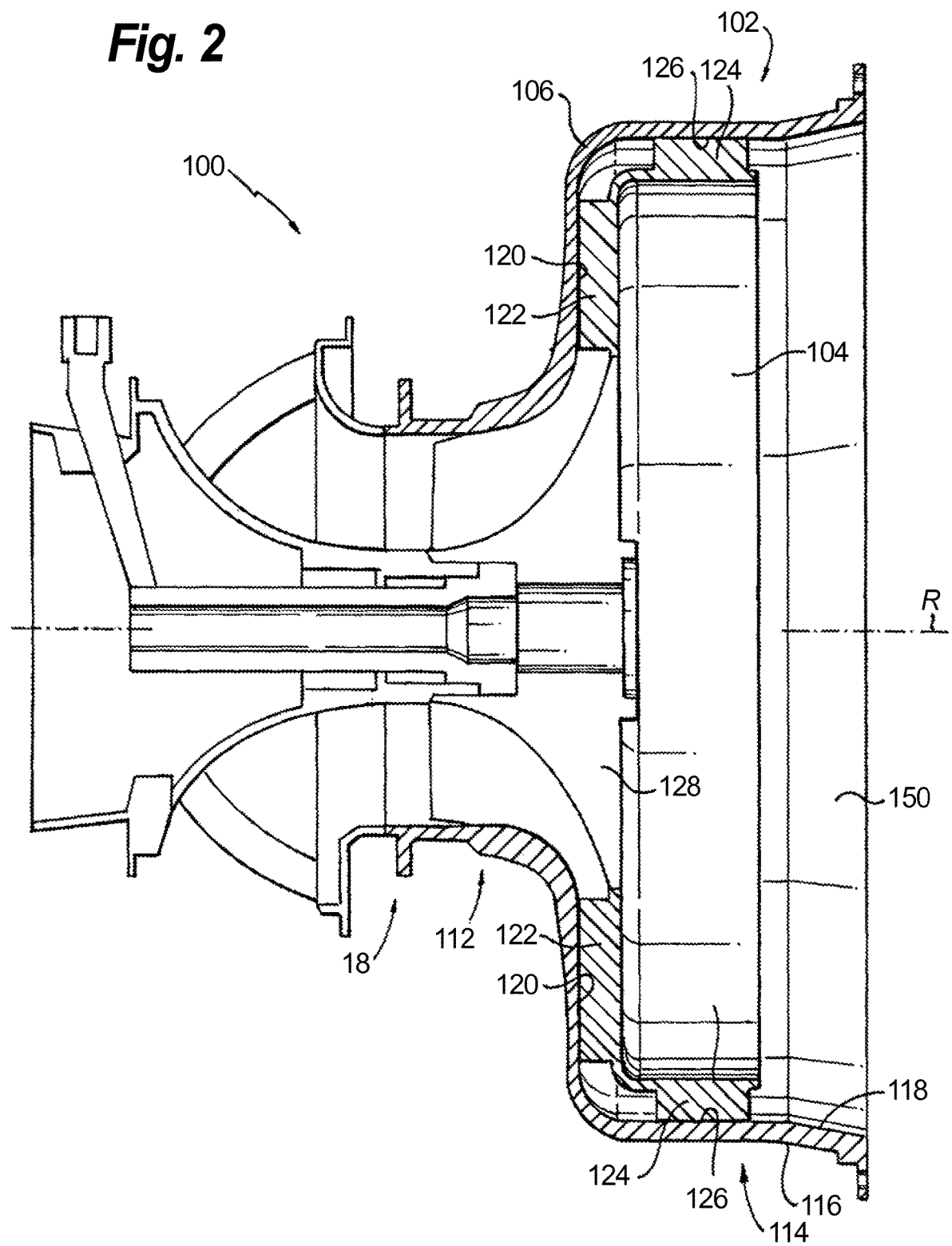
FIG. 2 is a cross-sectional side elevation view of the containment structure of FIG. 1, showing a stator shroud with an impeller rotateably supported therein.

With reference to FIG. 2, containment structure 100 is shown. Containment structure 100 includes a stator shroud 102 and a diffusor plate 104. Stator shroud 102 includes a wall 106 that spans rotation axis R between an inlet aperture 108 and an outlet aperture 110 of stator shroud 102. Stator shroud inlet aperture 108 is disposed on an upstream end of stator shroud 102 and stator shroud outlet aperture 110 is disposed on an opposite downstream end of stator shroud 102. Rotation axis R extends through both stator shroud inlet aperture 108 and stator shroud outlet aperture 110 through respective impeller cavity 112 and diffusor plate cavity 114.

Wall 106 extends between an exterior surface 116 and an interior surface 118 of stator shroud 102. Interior surface 118 bounds both impeller cavity 112 and diffusor plate cavity 114. As illustrated, wall 106 defines an axially necked profile that extends from a relatively narrow upstream portion including inlet aperture 108 and impeller cavity 112, to a relatively wide downstream portion that includes diffusor plate cavity 114 and outlet aperture 110.

Diffusor plate 104 seats within stator shroud 102 at an axial location upstream relative to stator shroud outlet aperture 110. Diffusor plate 104 includes a plurality of diffusor vanes 122 and flow-straightening vanes 124. Diffusor vanes 122 extend axially between diffusor plate 104 and diffusor plate seats 120 defined on axially-facing surface portions of interior surface 118, thereby coupling diffusor plate 104 to stator shroud 102. Flow-straightening vanes 124 extend radially relative to rotation axis R between diffusor plate 104 and flow-straightening vane seats 126 defined on radially inward facing portions of interior surface 118. As illustrated, diffusor vanes 122 and flow-straightening vanes 124 are integral with diffusor plate 104 and receive fasteners that couple diffusor plate 104 to stator shroud 102.

An impeller 128 is rotateably supported within impeller cavity 112 by a shaft 130 (shown in FIG. 1) that extends along rotation axis R. Impeller 128 may be a blisk (i.e. a bladed disk), and includes or more blades extending between a hub of impeller 128 and interior surface 118 of stator shroud 102. Impeller 128, diffusor plate 104, and interior surface 118 bound a core flow path that extends axially through stator shroud inlet aperture 108, along a periphery of impeller 128, radially outward from radial tips of impeller 128, through diffusor vanes 122, and through flow straightening vanes 124 prior to fluid compressed by the compressor reaching combustor section 14 (shown in FIG. 1) and turbine 20 (shown in FIG. 1).

Gas turbine engines can require certification prior to integration into an aircraft type. Certification generally requires that the gas turbine engine satisfy certain criteria, such as burst protection criteria. Satisfaction of the burst protection criteria can be established by a showing of analysis and/or testing that a containment parameter is above a predetermined threshold level. The containment parameter is typically determined by calculating the potential or strain energy of the material static structure. Since superalloys, i.e. alloys having a nickel content greater than 45% mass, generally have excellent percent elongation and tensile strength at compressor section temperatures, conventional wisdom is to construct compressor section housings from nickel-based superalloys to produce structures that satisfy certification burst criteria.

As illustrated in FIG. 2, containment structure 100 (e.g. stator shroud 102 and/or diffusor plate 104) includes material with a nickel content of less than 44%. In embodiments, containment structure 100 includes an iron based material. In certain embodiments, the iron based material is a stainless steel. It is contemplated that the stainless steel can have a nickel content of between about 8% and 9% by mass. It is further contemplated that the stainless steel can have a relatively high nitrogen content. Examples of such materials include UNS S24100, UNS S24000, UNS S21900, UNS S20910, and UNS S21800. Such alternative stainless steel materials are generally not used for stator shrouds as the temperatures within engine compressor sections can exceed the crossover temperature of the material for purposes of rotor containment. This can reduce the containment parameter of stator shroud to levels such that part no longer satisfies the certification burst criteria. However, substantially equivalent or better containment parameter can be obtained for stator shroud 102 using a stainless steel alloy. The benefits of such stainless steel alloy stem from the alloy tensile properties at elevated temperature, low density, and dynamic impact or strength characteristics. This enables forming stator shroud 102 from a less costly material, with potentially greater burst protection and/or with reduced weight in comparison to housings constructed from nickel-based alloys.

Figure 3:
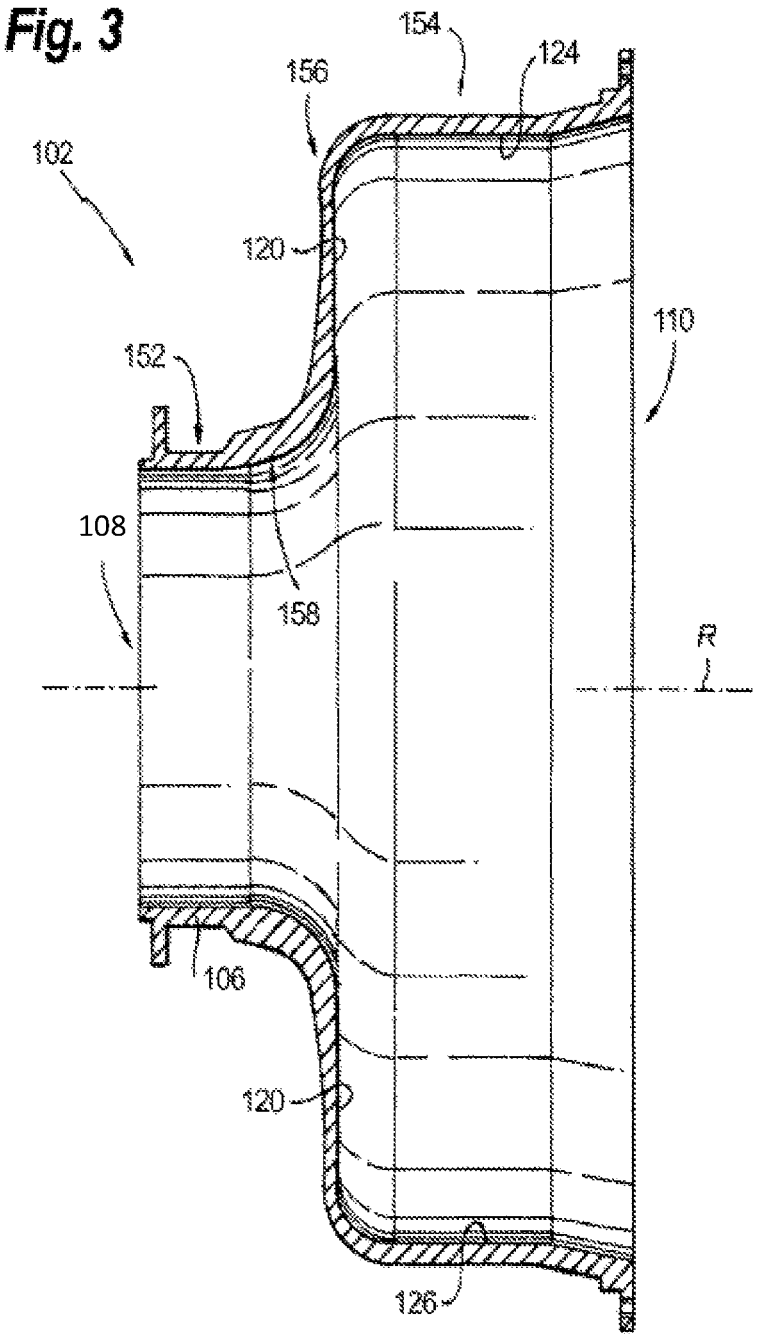
FIG. 3 is a cross-sectional side elevation view of the stator shroud of FIG. 2, showing a stator shroud wall with thickness that varies according to axial location.

With reference to FIG. 3, stator shroud 102 is shown, according to an embodiment. Rotation axis R extends between the inlet and outlet apertures of stator shroud 102. Stator shroud 102 has a necked profile relative to rotation axis R, an upstream end 152 defining stator shroud inlet aperture 108 having a smaller radial diameter than a downstream end 154 defining stator shroud outlet aperture 110. As illustrated, wall 106 has a thickness that varies axially. For example, thickness of the wall (e.g. a radial thickness) decreases along a portion 156 of stator shroud 102 extending between shroud outlet aperture 110 and the diffuser vane seats. Wall 106 also thickens along a portion 158 extending between stator shroud inlet aperture 108 and diffuser vane seats 120. These changes in wall thickness offset the decreased tensile strength of stainless steel material 150 (shown in FIG. 2), thereby improving the containment parameter of stator shroud 102 such that it is the same or better than a conventional shroud constructed from a super-alloy material.

Figure 4:
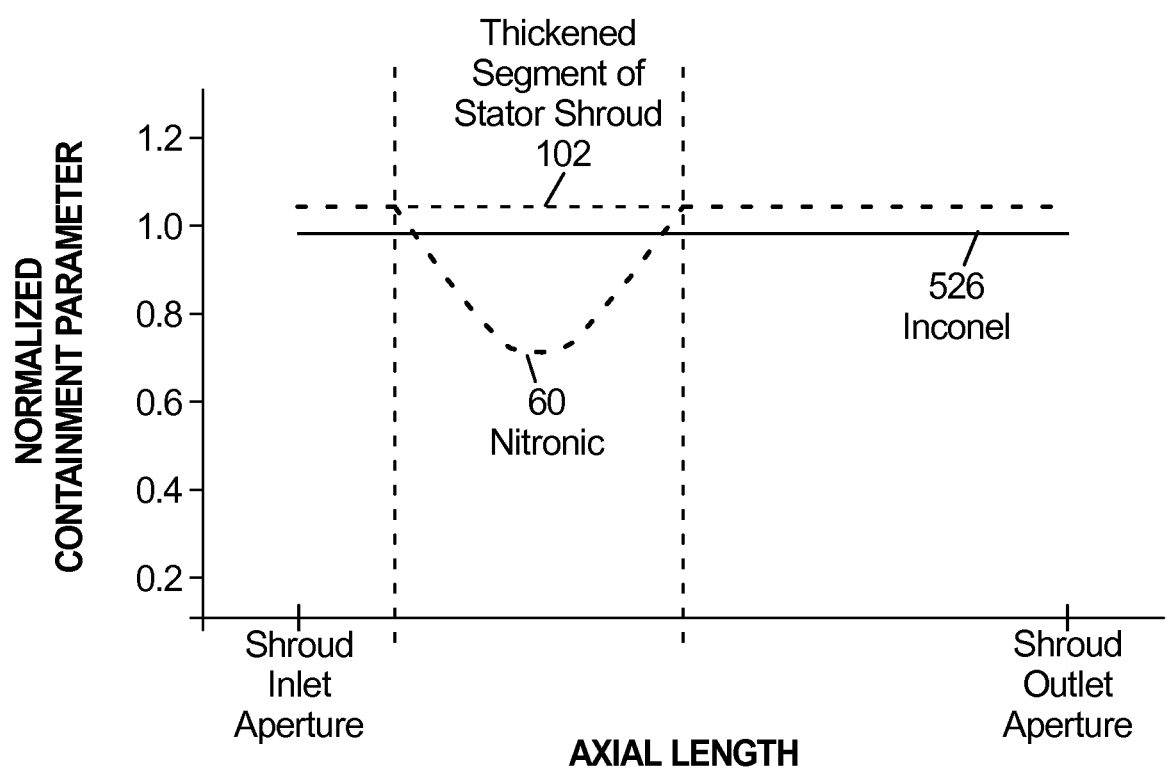
FIG. 4 is a normalized chart of a containment parameter for the containment structure of FIG. 1, showing the containment parameter for a stator shroud constructed as described herein in comparison to a housing constructed from a nickel-based material.

With reference to FIG. 4, a normalized chart of containment parameters is shown as a function of stator shroud axial length. Relative to conventional stator shrouds constructed from nickel based alloys, shrouds constructed stainless steel alloys generally offer equivalent or better containment parameters except for shroud regions where the shroud is exposed to temperatures greater than the shroud material cross-over temperature. However, by changing the wall thickness of the shroud, the containment parameter can be improved such the stator shroud with minor changes to the shroud geometry has a containment parameter that is greater than the conventional stator shroud. This can allow for constructing a shroud with improved containment qualities at reduced cost. It can also provide a stator shroud that is relatively lightweight in comparison to a conventional shroud.

Conventional compressor stator shrouds are typically constructed from nickel-based super alloys having relatively high nickel content. Such alloys generally have both excellent tensile strength and impact resistance at elevated temperatures. In embodiments described herein, compressor stator shroud include stainless steel alloys with low nickel content and which provide better specific strength and impact resistance than nickel-based steel alloys.

The methods and systems of the present disclosure, as described above and shown in the drawings, provide for compressor modules with superior properties including at least one of improved wear properties, erosion resistance, impact resistance and cost in comparison to conventional compressor modules. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A containment structure for a gas turbine engine, comprising:
 a stator shroud with a wall extending axially between a shroud inlet aperture and a shroud outlet aperture, wherein the wall includes a stainless steel material having less than 44% nickel by mass to provide containment protection for an impeller rotatably disposed within an interior of the stator shroud, the stator shroud defining a diffuser vane seat on an interior surface of the wall facing the shroud outlet aperture, and a first wall thickness at the shroud outlet aperture greater than a second wall thickness at the diffuser vane seat, wherein the wall is a single unitary element from the shroud inlet aperture to the shroud outlet aperture, the diffuser vane seat having a first upstream end and a second downstream end opposite the first upstream end, the stator shroud having an upstream wall thickness at the first upstream end greater than a downstream wall thickness at the second downstream end;
 wherein the stator shroud defines a flow-straightening vane seat disposed between the diffuser vane seat and the shroud outlet aperture, the flow-straightening vane seat facing radially inward relative to a rotation axis extending between the shroud inlet and outlet apertures, the wall increasing in thickness between the second downstream end and an axially upstream end of the flow-straightening vane seat.

2. A containment structure as recited in claim 1, wherein the stator shroud is formed from a stainless steel material having a nickel content of between 8% and 9% by mass.

3. A containment structure as recited in claim 1, wherein the stator shroud material includes one or more of UNS S24100, UNS S24000, UNS S21900, UNS S20910, and UNS S21800.

4. A containment structure as recited in claim 1, wherein the stator shroud includes Alloy 218 or UNS S21800.

5. A containment structure as recited in claim 1, wherein the shroud outlet aperture has a greater diameter than the shroud inlet aperture relative to a rotation axis defined by the stator shroud.

6. A containment structure a recited in claim 1, wherein a thickness of the wall increases between the diffuser vane seat and the shroud inlet aperture.

7. A compressor module comprising:
 a containment structure, including:
 a stator shroud with a wall extending axially between a shroud inlet aperture and a shroud outlet aperture, the stator shroud defining a diffuser vane seat on an interior surface of the wall facing the shroud outlet aperture, and a first wall thickness at the shroud outlet aperture greater than a second wall thickness at the diffuser vane seat, wherein the wall is a single unitary element from the shroud inlet aperture to the shroud outlet aperture, the diffuser vane seat having a first upstream end and a second downstream end opposite the first upstream end, the stator shroud having an upstream wall thickness at the first upstream end greater than a downstream wall thickness at the second downstream end;
 wherein the stator shroud defines a flow-straightening vane seat disposed between the diffuser vane seat and the shroud outlet aperture, the flow-straightening vane seat facing radially inward relative to a rotation axis extending between the shroud inlet and outlet apertures, the wall increasing in thickness between the second downstream end and an axially upstream end of the flow-straightening vane seat;
 a diffuser plate coupled to the stator shroud and seated within the shroud outlet aperture; and
 an impeller rotatably supported within the stator shroud between the diffuser plate and the shroud inlet aperture, wherein the wall extends axially between the inlet aperture and the outlet aperture and includes a stainless steel material having less than 44% nickel by mass to provide containment protection for the impeller.

8. A compressor module as recited in claim 7, further including a diffuser vane coupling the diffuser plate to the stator shroud at the diffuser vane seat.

9. A compressor module as recited in claim 8, wherein the diffuser vane is disposed radially outward of the impeller relative to a rotation axis of the impeller.

10. A compressor module as recited in claim 7, wherein a thickness of the wall increases between the diffuser vane seat and a location adjacent to the impeller.

11. A compressor module as recited in claim 7, wherein the stator shroud includes a stainless steel material having a nickel content of between 8% and 9% by mass.

12. A compressor module as recited in claim 7, wherein the stator shroud material includes one or more of UNS S24100, UNS S24000, UNS S21900, UNS S20910, and UNS S21800.

13. A gas turbine engine, comprising:

a containment structure, including:

a stator shroud with a wall extending axially between a shroud inlet aperture and a shroud outlet aperture, the stator shroud defining a diffuser vane seat on an interior surface of the wall facing the shroud outlet aperture, and a first wall thickness at the shroud outlet aperture greater than a second wall thickness at the diffuser vane seat, wherein the wall is a single unitary element from the shroud inlet aperture to the shroud outlet aperture; the diffuser vane seat having a first upstream end and a second downstream end opposite the first upstream end, the stator shroud having an upstream wall thickness at the first upstream end greater than a downstream wall thickness at the second downstream end;

wherein the stator shroud defines a flow-straightening vane seat disposed between the diffuser vane seat and the shroud outlet aperture, the flow-straightening vane seat facing radially inward relative to a rotation axis extending between the shroud inlet and outlet apertures, the wall increasing in thickness between the second downstream end and an axially upstream end of the flow-straightening vane seat; and a diffuser plate coupled to the stator shroud and seated within the shroud outlet aperture;

an impeller rotatably supported within the shroud between the diffuser plate and the shroud inlet aperture;

a turbine operatively associated with the impeller; and wherein the wall of the shroud extends axially between the shroud inlet aperture and the shroud outlet aperture and includes a stainless steel material having less than 44% nickel by mass to provide containment protection for the impeller.

* * * * *